United States Patent
Levesque et al.

(10) Patent No.: US 9,588,339 B2
(45) Date of Patent: Mar. 7, 2017

(54) DEVICE FOR CONTROLLING THE PHASE OF AN OPTICAL WAVEFRONT HAVING JUXTAPOSED METAL-MULTIDIELECTRIC-METAL STRUCTURES TO INDUCE A LOCAL SHIFT

(71) Applicants: Office National d'Etudes et de Recherches Aérospatiales—ONERA, Palaiseau (FR); Centre Nationale de la Recherche Scientifique—CNRS, Paris (FR)

(72) Inventors: Quentin Levesque, Bougival (FR); Patrick Bouchon, Verrières-le-Buisson (FR); Riad Haidar, Paris (FR); Fabrice Pardo, Vitry-sur-Seine (FR)

(73) Assignees: Office National d'Etudes et de Recherches Aérospatiales—ONERA, Palaiseaux (FR); Centre Nationale de la Recherche Scientifique—CNRS, Paris (FR)

( * ) Notice: Subject to any disclaimer, the term of this patent is extended or adjusted under 35 U.S.C. 154(b) by 99 days.

(21) Appl. No.: 14/648,489

(22) PCT Filed: Nov. 29, 2013

(86) PCT No.: PCT/EP2013/075167
§ 371 (c)(1),
(2) Date: May 29, 2015

(87) PCT Pub. No.: WO2014/083182
PCT Pub. Date: Jun. 5, 2014

(65) Prior Publication Data
US 2015/0301333 A1    Oct. 22, 2015

(30) Foreign Application Priority Data
Nov. 30, 2012 (FR) ..................... 12 61491

(51) Int. Cl.
*G01J 9/00* (2006.01)
*G02B 27/00* (2006.01)
(Continued)

(52) U.S. Cl.
CPC ............ *G02B 27/0087* (2013.01); *G01J 9/00* (2013.01); *G02B 5/1809* (2013.01); *B82Y 20/00* (2013.01); *G02B 5/008* (2013.01); *G02B 27/58* (2013.01)

(58) Field of Classification Search
CPC .... G01J 9/00; G01J 9/0215; G01J 2009/0265; G02B 26/06; G02B 27/0025
(Continued)

(56) References Cited

U.S. PATENT DOCUMENTS

| 4,865,454 A * | 9/1989 | Lazzarini | G01J 9/00 250/201.9 |
| 2009/0020690 A1 | 1/2009 | Toda | |

FOREIGN PATENT DOCUMENTS

| WO | 2011/100070 A1 | 8/2011 |
| WO | 2011/129814 A1 | 10/2011 |

OTHER PUBLICATIONS

International Search Report issued in PCT/EP2013/075167, mailed Feb. 4, 2014 (5 pages).
(Continued)

Primary Examiner — Que T Le
(74) Attorney, Agent, or Firm — Osha Liang LLP

(57) ABSTRACT

According to one aspect, the invention relates to a device (20, 50) for controlling the phase of an incident optical wavefront of wavelength comprised in a spectral band of given use, comprising a substrate (21) that is at least partially transparent in said spectral band and a set of strips (22$_i$, 23$_i$, 24$_i$) arranged substantially perpendicularly to the surface of the substrate, characterized in that: said set of
(Continued)

strips comprises an alternation of juxtaposed strips respectively made of a metal ($22_i$), of a first dielectric ($23_i$) and of at least one second dielectric ($24_i$) different from the first dielectric, such as to form juxtaposed metal/multi dielectric/metal (MmultiDM) structures ($S_i$) of subwavelength widths ($w_i$), each structure forming a cavity having one or more propagation modes—the respective thicknesses of the strips made of the first dielectric and of the second dielectric(s) are adjusted in each of said MmultiDM structures to induce a local shift ($\Delta\Phi_i$) in the phase of the wavefront, the local phase shift being dependent on the effective index of the mode(s) able to propagate in said cavity.

18 Claims, 6 Drawing Sheets

(51) Int. Cl.
  *G02B 5/18* (2006.01)
  *B82Y 20/00* (2011.01)
  *G02B 5/00* (2006.01)
  *G02B 27/58* (2006.01)

(58) Field of Classification Search
  USPC ...... 250/201.9, 216, 237 G, 237 R; 359/247; 356/488–499, 503, 504
  See application file for complete search history.

(56) References Cited

OTHER PUBLICATIONS

Written Opinion issued in PCT/EP2013/075167, mailed Feb. 4, 2014 (5 pages).
International Preliminary Report on Patentability issued in PCT/EP2013/075167, dated Nov. 19, 2014 (5 pages).

* cited by examiner

DEVICE FOR CONTROLLING THE PHASE OF AN OPTICAL WAVEFRONT HAVING JUXTAPOSED METAL-MULTIDIELECTRIC-METAL STRUCTURES TO INDUCE A LOCAL SHIFT

TECHNICAL FIELD OF THE INVENTION

The present invention relates to a device for controlling the phase of an optical wavefront and a method for producing such a device.

STATE OF THE ART

The miniaturization of optical systems to the sub-wavelength scale for wavelengths typically lying between 400 nm and 100 μm—in order to produce specific optical functions, technologically feasible and offering direct industrial applications, has today become an industrial issue. It notably allows for a better integration of the optical systems, a greater robustness and the possibility of direct coupling between the optics and the electronics.

The article by P. Lalanne et al. ("Design and fabrication of blazed binary diffractive elements with sampling periods smaller than the structural cutoff", JOSA A, vol. 16, No. 5, 1999) presents a first technique for producing a lens and a prism using the lamellar etching of a dielectric material. The optical index of a zone varies between a maximum value imposed by the index of the dielectric used and a minimum value, the index of air. The ratio between the quantity of dielectric material and that of air defines the optical index of the zone. A similar device is presented in the patent application US2009/0020690. Such a technique makes it possible to produce strong index modulations while using controlled technological methods. However, with the structuring operations inducing a mean effective index to the wavelength scale, the modulation of the phase of the optical wavefront to sub-wavelength scales cannot be obtained by simply structuring the dielectric material to the nanometric scale. This last point constitutes a major physical limitation for the control of the phase of the wavefront to the sub-wavelength scale.

Another technique, described in the article by H. Shi et al. ("Beam manipulating by metallic nano-slits with variant widths", Optics Express, vol. 13, No. 18, 2005) or in the patent application WO2011/100070, allows for a modulation of the phase of the wavefront to a scale smaller than the wavelength. According to this technique, the nano-structuring of a thick metal layer in the form of blades allows for the modulation of an incident light wavefront. More specifically, each slit obtained behaves like a waveguide independent of the others in which coupled plasmonic modes are propagated. It has been demonstrated (see for example S. Collin et al. "waveguiding in nanoscale metallic apertures", Optics Express, vol. 15, No. 7, 2007) that the effective index $n_{eff}$ seen by the mode being propagated in the duly produced waveguide depends on the width w of the slit according to a function which can be approximated under certain conditions by the following equation (1):

$$n_{eff} = n(1 + \delta/w) \quad (1)$$

in which n is the index of the dielectric material with which the slit is filled and δ denotes the optical skin thickness of the metal. FIG. 1 thus represents the trend of the effective index as a function of the width of the slit for a wavelength of 650 nm for a layer having a thickness h of 1 μm. In this example, the slits are filled with air, the walls are made of gold, with an optical skin thickness of the order of 25 nm. FIG. 1 reveals the possibility, by virtue of the technique described, of covering an effective index band ranging from n to three times n for guide width values w of 12.5 nm (δ/2) to 250 nm (10δ), thus allowing for strong phase variations from one slit to another by virtue of the choice of the width w of the slit. However, a great index modulation (Δn>0.5) is possible only for slit widths less than two times the skin thickness in the metal (w<2δ), that is to say, typically, 50 nm for the optical and infrared (IR) wavelengths, which constitutes a strong technological constraint. Moreover, FIG. 1 shows the very strong sensitivity of the effective index to the variations of the width of the slit and therefore to the production inaccuracies. Within a width range such as 5 nm≤w≤40 nm, a variation of 1 nm of the width of the slit leads to an error on the effective index of $\Delta n_{eff}/n_{eff} \geq 0.13$. The invention aims to propose a device for controlling the phase of a wavefront to the sub-wavelength scale, whose sensitivity as a function of the structural variations of the device is low.

SUMMARY OF THE INVENTION

According to a first aspect, the invention relates to a device for controlling the phase of an incident optical wavefront having a wavelength in a given spectral band of use, comprising a substrate that is at least partially transparent in said spectral band and a set of blades arranged substantially at right angles to the surface of the substrate, wherein:

said set of blades comprises an alternation of juxtaposed blades, respectively made of a metal material, of a first dielectric material and of at least one second dielectric material different from the first dielectric material, so as to form juxtaposed metal-multidielectric-metal (MmultiDM) structures, of sub-wavelength widths, each structure forming a cavity exhibiting one or more propagation modes, the respective thicknesses of the blades made of a first dielectric material and of second dielectric material(s) are adjusted in each of said MmultiDM structures to introduce a local shift of the phase of the wavefront, the phase shift induced being dependent on the effective index of the mode or modes able to be propagated in said cavity.

The applicant has demonstrated that such a device notably offers the advantage over the phase control devices described in the prior art of being able to work with structures of greater widths, typically ten times greater than the optical skin thickness of the metal material, thus making it possible to relax the technological constraints while retaining a control of the phase of the wavefront to a sub-wavelength scale. Moreover, it is possible to obtain local phase shift values with a sensitivity with respect to structural defects, notably with respect to variations of blade thicknesses or cavity widths, that is reduced. The respective thicknesses of the blades made of dielectric material are thus adjusted to locally obtain a phase shift calculated on the basis of an optical function sought for the production of an optical component in a given spectral band of use, said optical function being able to be sampled on the number of MMultiDM structures of the device.

According to a variant, the widths of the MmultiDM structures are chosen to be substantially equal, only the respective thicknesses of the blades made of dielectric material varying from one structure to another to control the local phase shift. This makes it possible, for an equivalent result, to work with cavity widths that are identical and sufficiently great compared to the optical skin thickness of the metal, thus facilitating the fabrication of the device.

Advantageously, for an operation of the device in the infrared, the width of each MmultiDM structure is chosen to be greater than or equal to 10 times the optical skin thickness of the metal material.

According to a variant, the width of the MmultiDM structures is moreover chosen to be less than or equal to $\lambda_{min}/2n_H$ where $\lambda_{min}$ is the minimum wavelength of the spectral band of use and $n_H$ is the refractive index of the dielectric material of the highest index. This choice of width for the MmultiDM structures makes it possible to produce single-mode cavities, with the applicant having demonstrated that they exhibited a very good transmission efficiency by virtue of the good containment of the longitudinal modes.

Advantageously, two different types of dielectric material will be chosen to form the structures, each structure thus comprising a first blade made of a first dielectric material and a second blade made of a second dielectric material different from the first dielectric material to form a metal-dielectric-dielectric-metal (MDDM) structure. The applicant has demonstrated that the MDDM structures represented an excellent trade-off between the result sought and the technological constraints.

Advantageously, the blades have a substantially identical given height. The height of the blades determines the maximum value of the local phase shift which can be applied to the phase of the incident wavefront. Advantageously, the height h is chosen to obtain a maximum local phase shift value of $2\pi$, which is sufficient to generate any optical function, and makes it possible to retain a minimum height of the blades and consequently to form cavities with a low aspect ratio (height-to-width ratio).

According to a variant, the blades are substantially rectilinear and the MmultiDM structures are arranged in a main direction. This configuration makes it possible for example to produce optical components of optical prism type, cylindrical optical lens type, and, generally, of symmetrical lens type or any one-dimensional optical function. These components will be sensitive to the polarization and will also be able to make it possible to form a polarization splitting device.

According to another variant, the blades are also substantially rectilinear but the MmultiDM structures are arranged in at least two main directions, advantageously substantially at right angles. This configuration makes it possible to produce, as previously, optical functions of the cylindrical optical lens or optical prism type. The device will be able to be designed in such a way that the profiles of the optical function produced are identical in both directions, making it possible to render the device insensitive to the polarization. Alternatively, different profiles in the two directions will make it possible to generate specific properties according to the polarization. It is thus possible to design a device for splitting the TE and TM components of a polarized incident wave randomly, for example a lens having a first focal distance for the TE component of the polarization and a second focal distance, different from the first focal distance, for the TM component of the polarization.

According to another variant, the blades are curvilinear, the MmultiDM structures being able to be arranged, according to a variant, according to an axial symmetry. This configuration makes it possible to produce optical components with symmetry of revolution, for example a spherical optical lens, convergent or divergent, or any other symmetrical optical function. As previously, an optical function with axial symmetry makes it possible to produce a device insensitive to the polarization whereas the production of an asymmetrical optical function will be able to make it possible to split the components of the polarization of an incident wave.

According to a variant, the substrate is made of dielectric material, the dielectric material forming the substrate being identical to one of said dielectric materials forming the blades. The use of the same material for the substrate and one of the blades of the structure notably makes it possible to simplify the fabrication method.

According to a variant, one of said dielectric materials is air. It will then be sufficient, in the fabrication method, to etch slits in the position of the blades intended to be formed by air.

The invention relates, according to a second aspect, to a detection system comprising a device for controlling the phase of an incident wavefront according to the first aspect and a detector, wherein the MmultiDM structures of the device are dimensioned to introduce a local shift of the phase of the wavefront, each local phase shift being determined by sampling an optical function corresponding to that of a convergent lens.

According to a third aspect, the invention relates to a method for controlling the phase of an optical wavefront by means of a device according to the first aspect, comprising:
  the spatial shaping of the wavefront to form an incident wavefront covering all the blades of the device,
  the transmission by each of the MMultiDM structures of a portion of the incident wavefront making it possible to introduce a local phase shift on said wavefront.

According to a fourth aspect, the invention relates to a method for fabricating a device for controlling the phase of an incident wavefront according to the first aspect, comprising:
  the etching of a layer of a first dielectric material to form a first set of slits in the place of the blades made of a metal material,
  the deposition of the metal in the place of said slits,
  the etching of said layer to form a second set of slits in the place of the blades made of a second dielectric material.

According to a variant, the method comprises the deposition, in the place of said slits of the second set of slits, of a second material made of dielectric material.

According to a variant, the layer made of a first dielectric material forms the substrate. Alternatively, the method can comprise a preliminary step of deposition of said layer made of a first dielectric material on a substrate.

According to a fifth aspect, the invention relates to a method for fabricating a device for controlling the phase of an incident wavefront according to the first aspect, comprising:
  the stacking of layers respectively made of a metal material and of dielectric materials in order to form said set of blades,
  the cutting and polishing of the stack produced and the fixing on a substrate substantially at right angles to the plane of the layers,
  the polishing of the face opposite the substrate.

BRIEF DESCRIPTION OF THE DRAWINGS

Other advantages and features of the invention will become apparent on reading the description, illustrated by the following figures.

DETAILED DESCRIPTION

Figure 1:
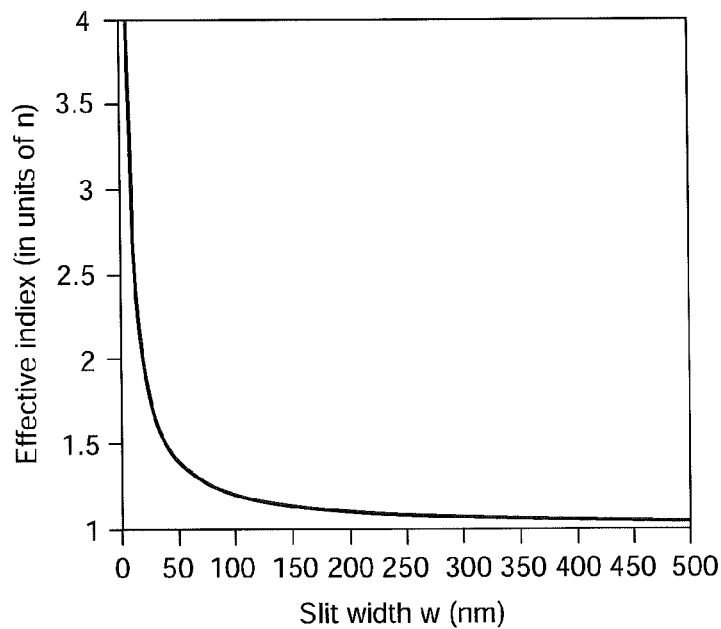
FIG. 1 (already described), a curve showing the trend of the effective index $n_{eff}$ in a slit as a function of the width w of the slit, in a device for controlling the phase of a wavefront according to the prior art.
Figure 2:
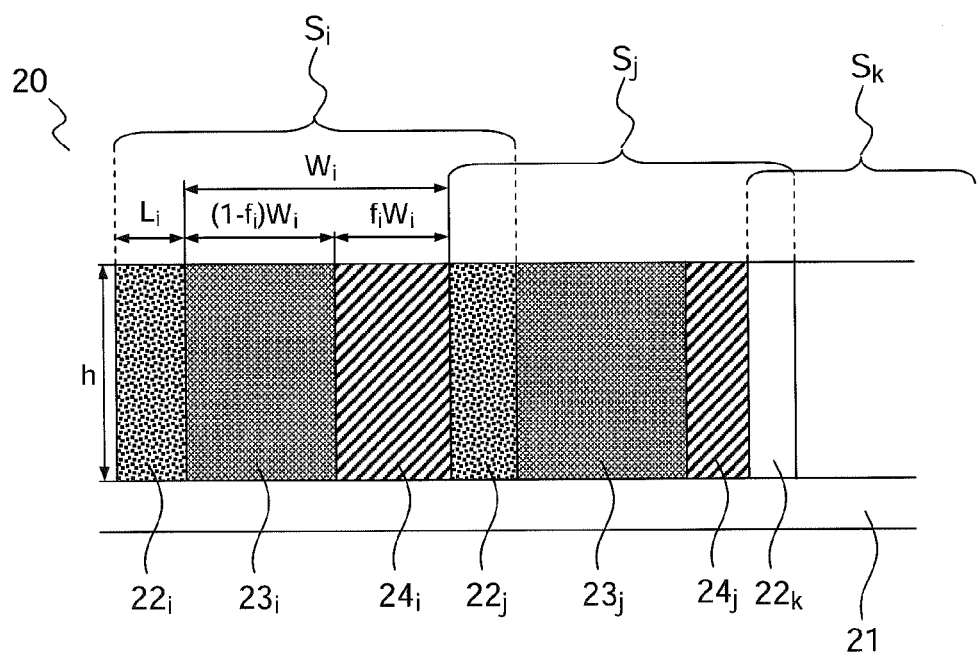
FIG. 2, a diagram illustrating the principle of an exemplary MDDM structure in a device according to the invention.

FIG. 2 shows a diagram illustrating the principle of an exemplary metal-multidielectric-metal (MmultiDM) structure in an exemplary phase control device 20 according to the invention. The device 20 is adapted to control the phase of a wavefront exhibiting a wavelength in a given spectral band of use of the device. The spectral band can lie between 400 nm and 100 μm. The device 20 comprises a substrate 21, transparent or partially transparent in the spectral band of use, and a set of blades (referenced $22_i$, $23_i$, $24_i$, $22_j$, $23_j$, $24_j$, $22_k$, etc. in FIG. 2) of height h, arranged substantially at right angles to the surface of the substrate. The blades are arranged in such a way as to form an alternation of juxtaposed blades, respectively made of a metal material ($22_i$), of a first dielectric material ($23_i$) and of at least one second dielectric material ($24_i$) different from the first dielectric material, then once again of a metal material ($22_j$), of a first dielectric material ($23_j$), of a second dielectric material ($24_j$) etc., so as to form juxtaposed metal-multidielectric-metal (MmultiDM) structures $S_i$. Although, in the example of FIG. 2, each structure $S_i$ comprises only two blades ($23_i$, $24_i$) made of different dielectric materials, it is also possible to envisage forming a device with, in each structure, an alternation between two blades made of a metal material ($22_i$, $22_j$) of 3 or more blades made of different dielectric materials.

Each metal-multidielectric-metal structure $S_i$ has a sub-wavelength width $w_i$ (defined between two metal blades $22_i$ and $22_j$), that is to say less than the minimum wavelength $\lambda_{min}$ of the spectral band of use of the device, the width $w_i$ being chosen so as to form a cavity exhibiting one or more propagation modes in the spectral band of use. When an optical wave of wavelength λ is incident on the device 20, it undergoes, locally at the level of each structure $S_i$, a phase shift $\Delta\Phi_i$ due to the propagation of a mode in the cavity formed by the structure, according to the equation:

$$\Delta\Phi_i = \frac{2\pi}{\lambda}(n_{eff} - n_L)h \quad (2)$$

in which $n_{eff}$ is the effective index of the mode being propagated in the cavity and $n_L$ is the "low" refractive index, that is to say the refractive index of the dielectric material of lowest index. In the above equation (2), the phase shift $\Delta\Phi_i$ is measured relative to a reference phase shift, defined here by the phase shift undergone by the incident wavefront when it passes through a blade of thickness h and of refractive index $n_L$. In particular, the nature of the dielectric materials present in the structure modifies the effective index of the mode being propagated. By choosing, in each structure $S_i$, the thickness of each of the blades made of dielectric material, it is possible to modify the effective index of the mode being propagated in the cavity formed and therefore the phase shift introduced locally.

In practice, it will be possible to choose dielectric materials exhibiting significant refractive index differences in order to create significant local phase shifts with a low blade height. Hereinafter in the description "high" index $n_H$ will be used to denote the refractive index of the dielectric material exhibiting the highest refractive index and "low" index $n_L$ will be used to denote the refractive index of the dielectric material exhibiting the lowest refractive index. For the dielectric material of the highest refractive index, it will be possible to choose, for example, a dielectric material that is transparent in the spectral band of use of the device and that exhibits a high optical index in this spectral band. For example, for an operation of the phase control device in band II and III, it is possible to choose, in a nonlimiting manner, gallium arsenide (GaAs), the refractive index of which is 3.3, germanium (Ge), the refractive index of which is approximately 4, amorphous silicon (Si a) of refractive index equal to 3.7, silica ($SiO_2$) of refractive index equal to 1.5 for wavelengths less than 5 μm, zinc sulfide (ZnS) of refractive index equal to 2.2. For an operation of the phase control device in the visible and infrared bands, it is possible to choose, in a nonlimiting manner, zinc selenide (ZnSe) or zinc sulfide (ZnS), the refractive index of which is 2.2. For the dielectric material of lowest refractive index, it will advantageously be possible to choose air, making it possible to maximize the difference between the high and low refractive indices.

The maximum phase shift is given by the height h of the blades. Thus, the minimum height h of the blades can be determined to ensure a maximum phase shift $\Delta\Phi_{max}$ given by the equation:

$$h = \Delta\Phi_{max} \frac{\lambda_{max}}{2\pi(n_H - n_L)} \quad (3)$$

in which $\lambda_{max}$ is the maximum wavelength of the spectral band of use, $n_H$ and $n_L$ are the respectively high and low refractive indices. For example, the height h of the blades can be chosen for the maximum phase shift $\Delta\Phi_{max}$ of the phase to be 2π, which is sufficient to define all the optical functions and makes it possible to limit the total height of the structure. Typically in the case of a band of use in the infrared, for example between 3 and 5 μm, by choosing, for high and low indices respectively, those of GaAs ($n_H$=3.3) and of air ($n_L$=1), a blade height h=2.2 μm will be sufficient to achieve a maximum local phase shift of 2π.

The metal walls or blades 22; advantageously have thicknesses $L_i$ greater than the skin thickness of the metal used, for example of the order of 2 times the optical skin thickness of the metal, thus ensuring that the propagation mode in the cavity formed by a structure $S_i$ is not disturbed by the cavities formed by the neighboring structures. Thus, in the case of the use of gold as metal material, the blades made of a metal material in the MMultiDM structures will be able to be of the order of 50 nm. The use of gold is preferred because the handling methods are perfectly controlled. However, other metal materials may be excellent candidates for the production of the structures of the device, such as, for example, copper, aluminum or silver. Advantageously, the width $w_i$ of a structure $S_i$ is chosen such that the cavity formed is single-mode, which makes it possible to obtain a good trade-off between the effectiveness of containment of the longitudinal mode that can be propagated in the cavity formed by the structure and a limited width of the structures. For example, to verify, in each structure, the condition of a single-mode cavity, the width $w_i$ can be chosen in such a way as to verify:

$$w_i \leq \frac{\lambda_{min}}{2n_H} \quad (4)$$

in which $\lambda_{min}$ is the minimum wavelength of the band of use chosen for the device and $n_H$ is the high refractive index. Thus, it will typically be possible to choose widths $w_i$ of the order of $\lambda/10$. Moreover, for technological reasons in particular, in the case of use in the infrared, it will be possible to advantageously choose the cavity widths greater than or equal to 10 times the optical skin thickness of the metal.

The example of FIG. 2 shows a particular phase control device using metal-dielectric 1-dielectric 2-metal (MDDM) structures, that is to say comprising, in each structure $S_i$, two blades $23i$, $24i$ made of different dielectric materials. This variant makes it possible to obtain, as is shown below, a very good trade-off between the accuracy of the control of the phase of the wavefront and the search for a fabrication method that is simple to implement. In this example, the structures $S_i$ have substantially equal widths $w_i$. Each structure $S_i$ comprises, between two metal blades $22_i$, $22_j$, two blades $23_i$, $24_i$ made of different dielectric materials denoted 1 and 2, the nature of the dielectric materials 1 and 2 being, however, the same in each of the structures. In practice, the respective proportion of the two dielectric materials is varied in each of the structures. Thus, it is possible to define, for example, a filling rate $f_i$ of the dielectric material 2 in the structure $S_i$. The thickness of the blade $24_i$ made of dielectric material 2 is then equal to the product $f_i w_i$ for the structure $S_i$ and the thickness of the blade $23_i$ made of dielectric material 1 is equal to the product $(1-f_i) w_i$. The effective index of the mode being propagated in each structure and therefore the local phase shift depends on the filling rate $f_i$.

Figure 3:
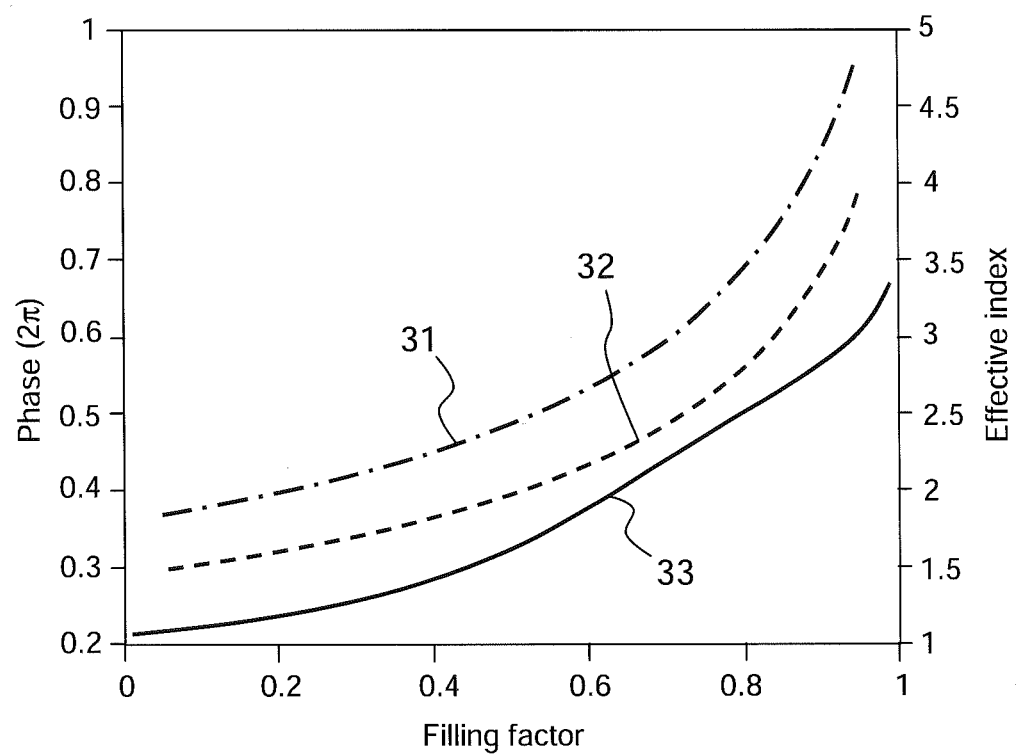
FIG. 3, curves showing digital simulations of the variation of index and of the phase in a structure of MDDM type filled with air and with gallium arsenide (GaAs) as a function of the filling factor (f) with GaAs for different widths w of the structure.

FIG. 3 thus illustrates curves showing the effective index calculated as a function of the filling factor $f_i$ in a device of the type of that illustrated in FIG. 2, for different values of the width $w_i$ of the structures. The resultant phase shift (given by the equation (2)) is also represented (modulo $2\pi$). More specifically, the curves are calculated with a height of the blades h=1 µm, a thickness of the metal walls $L_i$=50 nm and a wavelength in the incident medium (air) $\lambda$=5 µm. The curves 31, 32, 33 are obtained respectively for w=δ (25 nm), w=2δ (50 nm) and w=20δ (500 nm), in which δ is the skin thickness of the metal used, for example gold. The dielectric materials considered are respectively air for the dielectric material 1 ($n_L$=1) and gallium arsenide (GaAs) for the dielectric material 2 ($n_H$=3.3). The effective index of the mode is calculated, as is known, by modeling the propagation of the fundamental mode in the cavity, for example by a modal method. Account is taken of the propagation in the dielectric materials and of the reflections at the interfaces with the metal walls as well as the reflection and the transmission at the interface between the two dielectric materials. Matrix computation software (using python or Matlab® for example) is for example used for the modeling of the propagation and the computation of the effective index as a function of the filling factor $f_i$.

FIG. 3 shows how it is possible to vary the effective index of the propagative mode and therefore the local phase shift applied to the incident wavefront by adjusting not the width $w_i$ of the cavity formed by the structure but the filling factor $f_i$. It is not necessary to obtain strong phase shifts to work with low cavity widths $w_i$, because, as appears in FIG. 3, a variation of the phase shift can be obtained as a function of the filling factor, even for cavity widths as great as 20δ (curve 33), which makes it possible to relax the technological constraints on the production of the device. Moreover, FIG. 3 reveals the stability of the effective mode index, and therefore of the local phase shift applied to the incident wavefront, as a function of the width $w_i$ of the cavity and of the filling factor $f_i$. The applicant has notably demonstrated that, by choosing a cavity width $w_i$=500 nm (i.e. $\lambda/10$), a variation of 10 nm on the width $w_i$ has a negligible impact on the effective index of the propagative mode (<1%) and a variation of 10 nm on the width of the blade made of dielectric material 2 corresponding to a variation of 2% of the filling factor leads to a variation of the effective index $\Delta n/n$=0.03. Compared to the prior art system described in H. Shi et al., for example, the stability on the effective index of the propagative mode is significantly enhanced, making it possible to make the device much more reliable and less dependent on precision of the technology implemented to produce the device.

It will be easily understood that, by juxtaposing a number of structures $S_i$ as described for example in FIG. 2, and by adjusting, for each one, the filling factor of one of the dielectric materials, it is possible to modulate an incident wavefront by performing a spatial sampling of the wavefront with a pitch dependent on the width of the MmultiDM structures and by locally applying a given phase shift, chosen to produce the desired optical function. The wavefront can be extended spatially beforehand so as to cover all of the structures.

Figure 4:
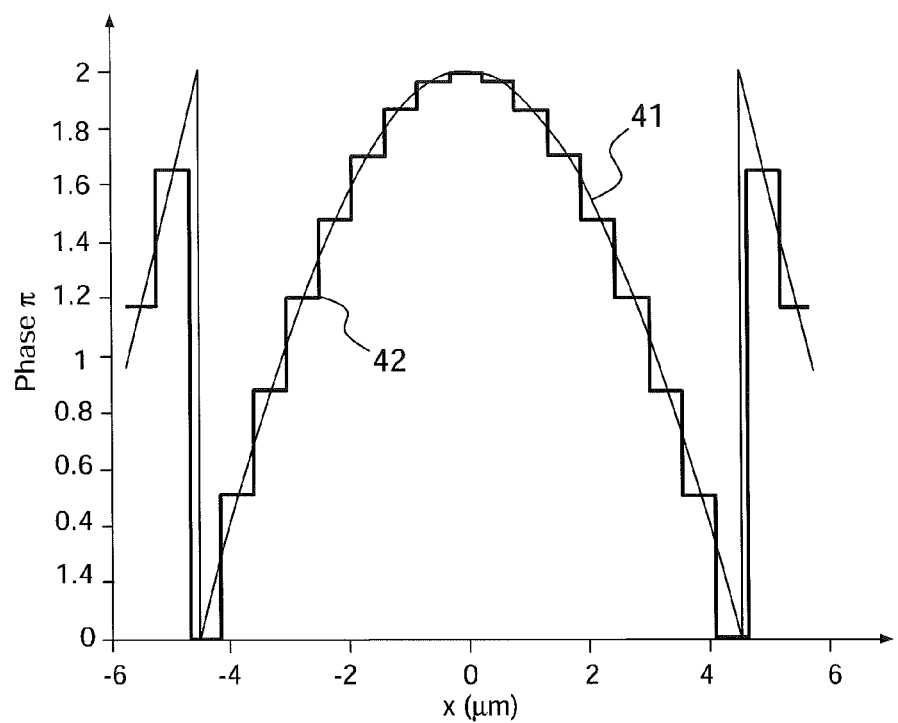
FIG. 4, a curve illustrating the phase function sought in the case of the application to the production of a device of convergent optical lens type and the resulting sampled function.

FIG. 4 thus illustrates the sampling required to produce a convergent lens. More specifically, the curve 41 represents the phase profile of a lens of diameter 11.5 µm having a focal distance of 6 µm at $\lambda \in 5$ µm and a height h=2.2 µm and the curve 42 represents the spatial sampling performed on 21 structures. The phase profile is written:

$$\Phi(x) = \frac{2\pi x \sin(\theta)}{\lambda} + \frac{2\pi n_L F}{\lambda} - \frac{2\pi n_L \sqrt{F^2 + x^2}}{\lambda} \quad (5)$$

in which F is the focal distance of the lens that is to be produced, $\theta$ is the angle of incidence ($\theta$=0 in the example of FIG. 4), x is the distance measured in a direction normal to the planes of the blades forming the structures $S_i$ and for which a reference (x=0) is taken at the level of the central structure of the device.

Figure 5:
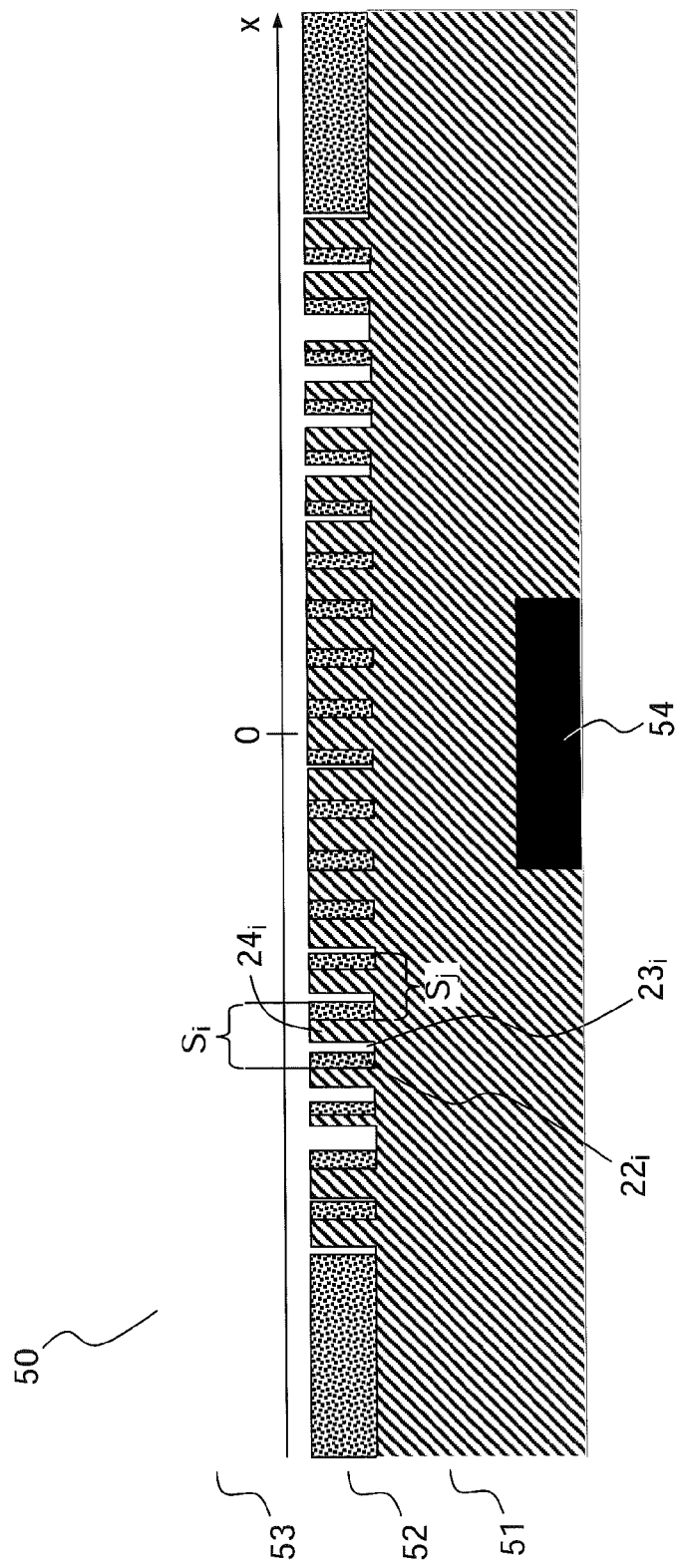
FIG. 5, an exemplary embodiment of a device according to the invention for the production of a function of the type of the optical function shown in FIG. 4.

FIG. 5 illustrates an exemplary device 50 for producing a phase profile as represented in the curve 42 of FIG. 4. The device comprises 21 structures $S_i$ of MDDM type as represented in FIG. 2. Each structure has a width $w_i$=500 nm, a height h=2.2 µm and a thickness of the metal blades $L_i$=50 nm. The device comprises three zones, an upper zone 53 and a lower zone 51 formed respectively by air and by gallium arsenide and an intermediate zone 52 comprising the 21 MDDM structures. The dielectric materials forming the blades $23_i$ and $24_i$ of each of the structures $S_i$ are formed respectively by air and gallium arsenide. The high and low refractive indices are therefore respectively $n_H$=3.3 and $n_L$=1. More specifically, in the example of FIG. 5, the MDDM structures exhibit a filling factor $f_i$ of GaAs relative to air of 89%, 97%, 17%, 65%, 80%, 90%, 94%, 97%, 99%, 99%, 100%, 99%, 99%, 97%, 94%, 90%, 80%, 65%, 17%, 97% and 89% making it possible to achieve the phase shifts sought on each of the structures. Such a device can be positioned upstream of a photodetector 54 to focus therein the energy of an incident light wave transmitted through the device and whose phase is modulated.

Figure 6:
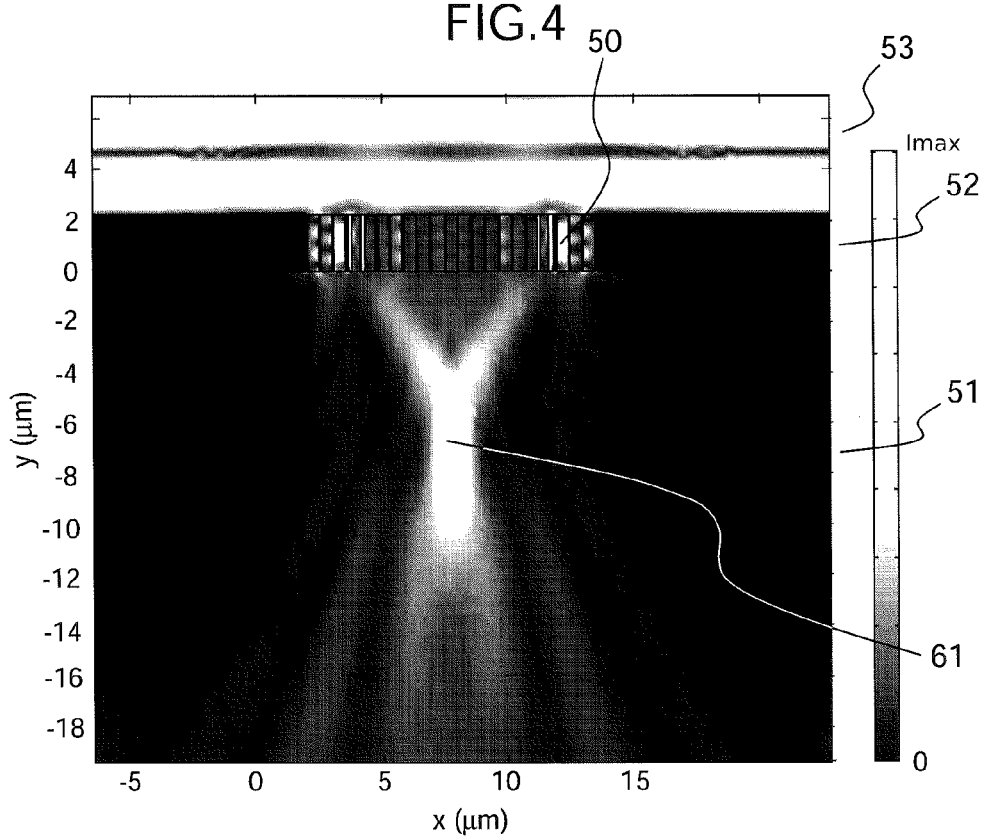
FIG. 6, a mapping of the light intensity calculated after modulation of the phase of an incident wavefront in a device of the type of that of FIG. 5.

FIG. 6 represents a mapping of the light intensity calculated in each of the zones 51 to 53 of the device 50 represented in FIG. 5. A convergence of the light energy is notably verified in a zone 60, confirming the production of a convergent lens to sub-wavelength scales.

In the example of FIGS. 4 to 6, a device is assumed that comprises substantially rectilinear blades, oriented in a main direction, the phase shift being calculated along the axis x normal to this direction of orientation of the blades. The resulting optical convergent lens function is therefore a cylindrical lens function. Alternatively, the blades can be rectilinear oriented in two main directions, or curvilinear, for example of generally circular form, juxtaposed in such a way as to exhibit a symmetry of revolution, in order to produce an optical spherical convergent lens function.

Figure 7A:
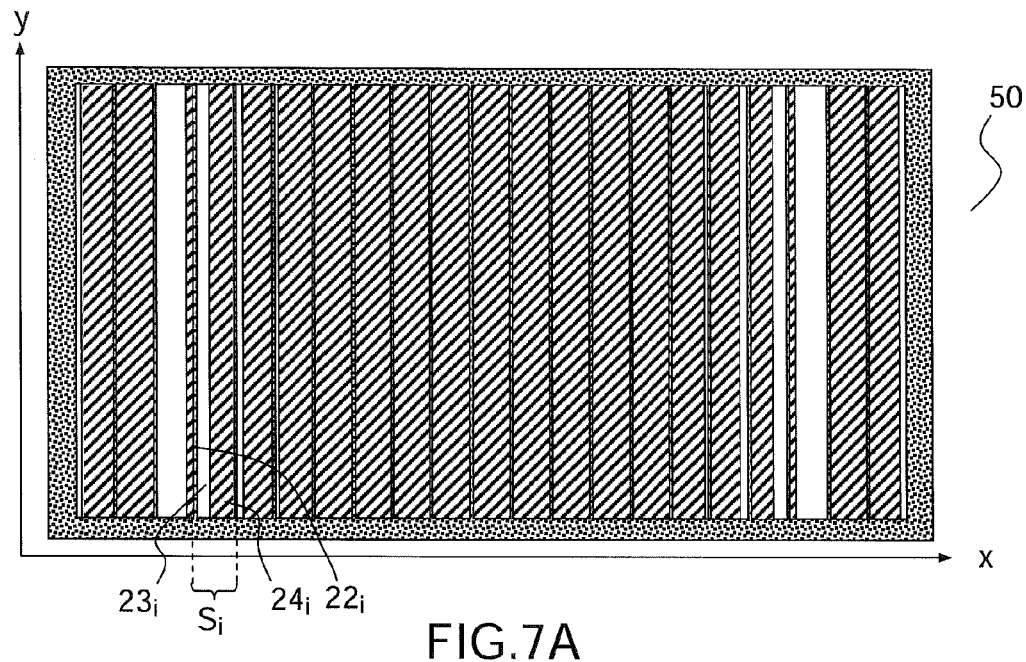
FIGS. 7A to 7C illustrate, seen from above, examples of a device in which the blades are of respectively rectilinear (FIGS. 7A and 7B) and curvilinear (FIG. C) form.
Figure 7B:
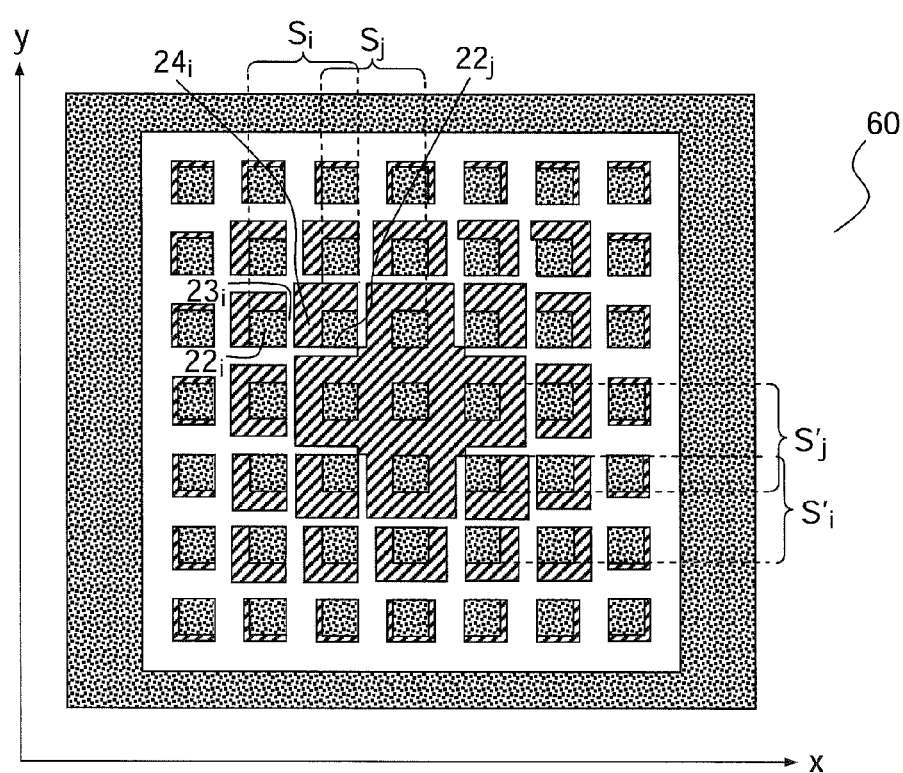
Figure 7C:
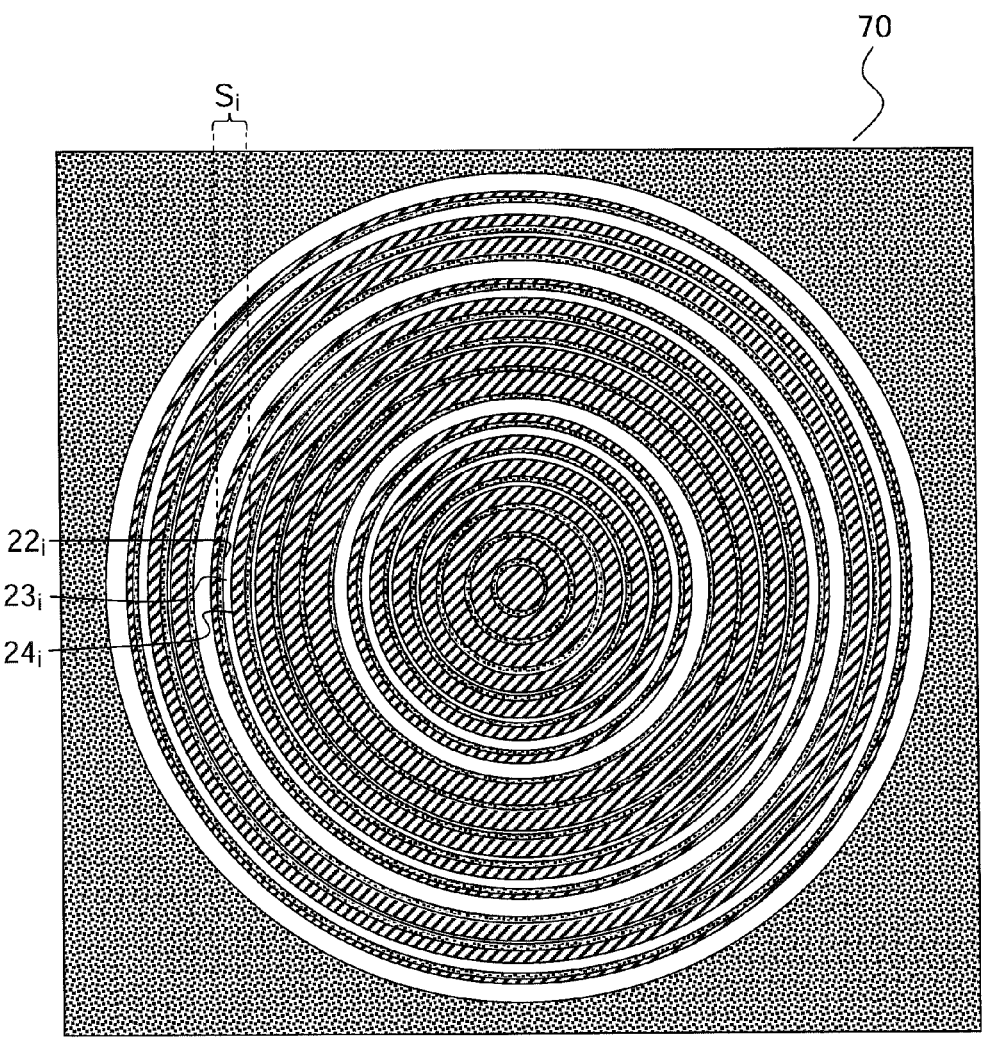

FIGS. 7A to 7C thus illustrate plan views respectively of the device represented in FIG. 5, and devices with blades that are rectilinear, arranged in two substantially orthogonal directions (FIG. 7B), and of circular form (FIG. 7C).

The device 60 represented in plan view in FIG. 7B has a generally rectangular form, with juxtaposed structures $S_i$, arranged in a first direction (x) and juxtaposed structures $S'_i$, arranged in a second direction (y) substantially at right angles to the first direction. As in the example of FIG. 5 or 7A, each structure $S_i$ or $S'_i$ comprises an alternation of blades made of a metal material ($22_i$), of a first dielectric material ($23_i$), of a second dielectric material ($24_i$) and of a metal material ($22_j$). As explained previously, an incident wavefront on such a device will undergo locally, on each structure, a local phase shift whose value is linked to the relative thicknesses of the blades made of first and second dielectric materials. It is thus possible to produce a two-dimensional optical function, for example a convergent optical lens function. In the example of FIG. 7B, the profile of the phase shift introduced on one or other of the axes x and y is identical. It follows therefrom that the device is insensitive to the polarization of the incident wave. Alternatively, it is possible to form structures whose arrangement on the axes x and y varies, so as to form a phase control device for which the response will be different as a function of the TE or TM component of the polarization. Thus, it will for example be possible to split the TE and TM components of a randomly polarized incident wave. For example, a convergent optical lens function will be able to be obtained, the focal length of which varies with the polarization.

The device 70 represented in plan view in FIG. 7C comprises curvilinear blades, of substantially circular form, arranged with an axial symmetry. As in the preceding examples, each structure $S_i$ comprises an alternation of blades made of a metal material ($22_i$), of a first dielectric material ($23_i$), of a second dielectric material ($24_i$) and of a metal material ($22_j$) such that an incident wavefront on the device will undergo locally, on each structure, a local phase shift whose value is linked to the relative thicknesses of the blades made of first and second dielectric materials. Because of the axial symmetry, the device 70 is insensitive to the polarization. For example, the structures are arranged to generate a convergent optical lens function of given focal length. Alternatively, it is possible to arrange the blades to obtain asymmetrical optical functions. For example, the blades can be curvilinear but not circular, for example elliptical, making it possible to split the TE and TM components of the polarization of an incident wave.

It is thus possible to access phase functions with any profiles, including abrupt profiles in which the variations are small compared to the wavelength.

A number of methods are possible for the fabrication of a device for controlling the phase of a wavefront according to the invention.

In the example of the device 50 illustrated in FIG. 5, the substrate is formed from the same dielectric material as that used for one of the blades of each structure. The method for fabricating such a device can comprise the etching of a substrate 51 (FIG. 5), for example a substrate made of GaAs, to form a first set of slits in the place of the blades 22; made of a metal material, then the growth of metal in the position of the slits, for example gold. The substrate is then etched to form a second set of slits in the place of the blades 23; made of a first dielectric material. The device as represented in FIG. 5 is then obtained, the first and second dielectric materials being formed respectively from air and GaAs.

According to a variant, if the first dielectric material is other than air, the deposition can be performed in the position of the slits of the second set of slits of the second material made of a dielectric material. Moreover, if the second dielectric material is other than the material forming the substrate, a preliminary step can be performed of deposition of a layer of a second dielectric material on a substrate, then the same steps as those described previously are performed.

Alternatively, in the case of a wavefront control device comprising juxtaposed rectilinear blades, for example a device of the type of that represented in FIG. 5 or 7A, the fabrication of the device can comprise the stacking of layers respectively made of a metal material and of dielectric materials in order to form the alternation of the blades which will form the assembly of the juxtaposed MmultiDM structures, then the cutting and the polishing of the stack produced and the fixing onto a substrate of the stack on its polished face, substantially at right angles to the plane of the layers. Then, the face of the stack opposite the substrate can be polished.

Although described through a certain number of detailed embodiments, the device for controlling the phase of a wavefront and the method for fabricating such a device comprise different variants, modifications and refinements which will become obvious to those skilled in the art, given that these different variants, modifications and refinements form part of the scope of the invention, as defined by the ensuing claims.

The invention claimed is:
1. A device for controlling the phase of an incident optical wavefront having a wavelength in a given spectral band of use, comprising:
   a substrate that is at least partially transparent in said spectral band and a set of blades arranged substantially at right angles to the surface of the substrate, wherein:

said set of blades comprises an alternation of juxtaposed blades, respectively made of metal material, of a first dielectric material and of at least one second dielectric material different from the first dielectric material, so as to form juxtaposed metal-multidielectric-metal (MmultiDM) structures, of sub-wavelength widths, each structure forming a cavity exhibiting one or more propagation modes, and the respective thicknesses of the blades made of a first dielectric material and of second dielectric material(s) are adjusted in each of said MmultiDM structures to induce a local shift of the phase of the wavefront, the local phase shift being dependent on the effective index of the mode or modes able to be propagated in said cavity.

2. The device as claimed in claim 1, wherein each structure comprises a first blade made of a first dielectric material and a second blade made of a second dielectric material different from the first dielectric material, forming a metal-dielectric-dielectric-metal (MDDM) structure.

3. The device as claimed in claim 1, wherein the widths of the MmultiDM structures are substantially equal.

4. The device as claimed in claim 1 suitable for use in the infrared, wherein the width of each MmultiDM structure is greater than 10 times the optical skin thickness of the metal material.

5. The device as claimed in claim 1, wherein the width of each MmultiDM structure is less than $\lambda_{min}/2n_H$ where $\lambda_{min}$ is the minimum wavelength of said spectral band and $n_H$ is the refractive index of the dielectric material of the highest index.

6. The device as claimed in claim 1, wherein the blades have a given height, determined so that the maximum value of the local phase shift is $2\pi$.

7. The device as claimed in claim 1, wherein the substrate is made of dielectric material, the dielectric material forming the substrate being identical to one of said dielectric materials.

8. The device as claimed in claim 1, wherein one of said dielectric materials is air.

9. The device as claimed in claim 1, wherein the blades are substantially rectilinear and the MmultiDM structures are arranged in a main direction.

10. The device as claimed in claim 1, wherein the blades are substantially rectilinear and the MmultiDM structures are arranged in at least two main directions.

11. The device as claimed in claim 1, wherein the blades are curvilinear, the MmultiDM structures being arranged according to an axial symmetry.

12. The device as claimed in claim 1, wherein the respective thicknesses of the blades made of dielectric material are adjusted to locally obtain a phase shift calculated on the basis of an optical function sought for the production of an optical component in a given spectral band of use, said optical function being sampled on the number of MMultiDM structures of the device.

13. A detection system comprising a device for controlling the phase of an incident wavefront as claimed in claim 1 and a detector, wherein the MmultiDM structures ($S_j$) of said device are dimensioned to introduce a local shift of the phase of the wavefront, each local phase shift being determined by sampling an optical function corresponding to that of a convergent lens.

14. A method for controlling the phase of an optical wavefront by means of a device as claimed in claim 1, comprising:
   spatial shaping of the wavefront to form an incident wavefront covering all the blades of the device; and
   transmission by each of the MMultiDM structures of a portion of the incident wavefront making it possible to introduce a local phase shift on said wavefront.

15. A method for fabricating a device for controlling the phase of an incident wavefront as claimed in claim 1, comprising:
   etching of a layer of a first dielectric material to form a first set of slits in the place of the blades made of a metal material;
   deposition of the metal in the place of said slits; and
   etching of said layer to form a second set of slits in the place of the blades made of a second dielectric material.

16. The fabrication method as claimed in claim 15, further comprising deposition, in the place of said slits of the second set of slits, of a second material made of dielectric material.

17. The fabrication method as claimed in claim 15, further comprising a preliminary step of deposition of said layer made of a first dielectric material on a substrate.

18. A method for fabricating a device for controlling the phase of an incident wavefront as claimed in claim 1, comprising:
   stacking of layers respectively made of a metal material and of dielectric materials in order to form said set of blades;
   cutting and polishing of the stack produced and the fixing on a substrate substantially at right angles to the plane of the layers; and
   polishing of the face opposite the substrate.

* * * * *